(No Model.)
J. E. STOOPS.
BICYCLE DRIVING GEAR.
No. 595,501. Patented Dec. 14, 1897.
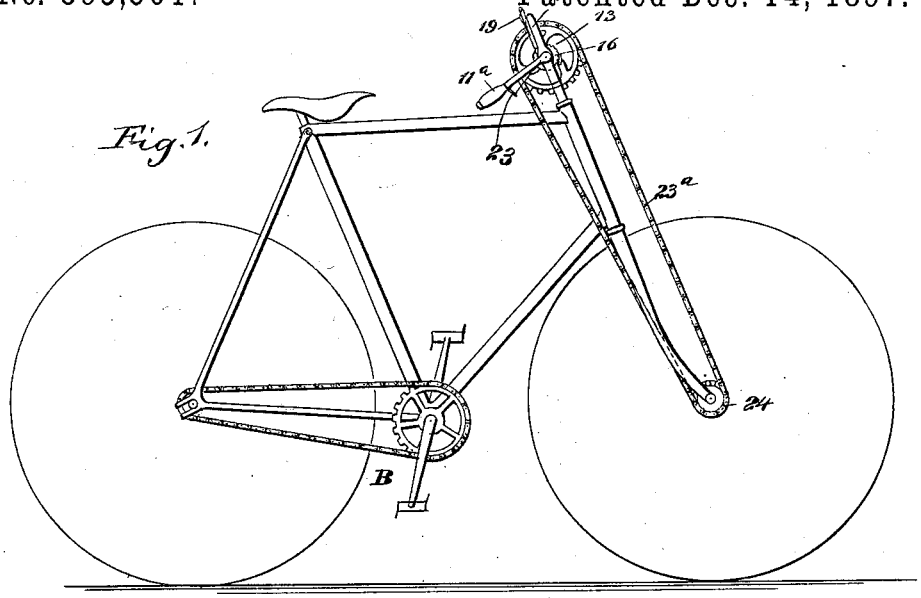
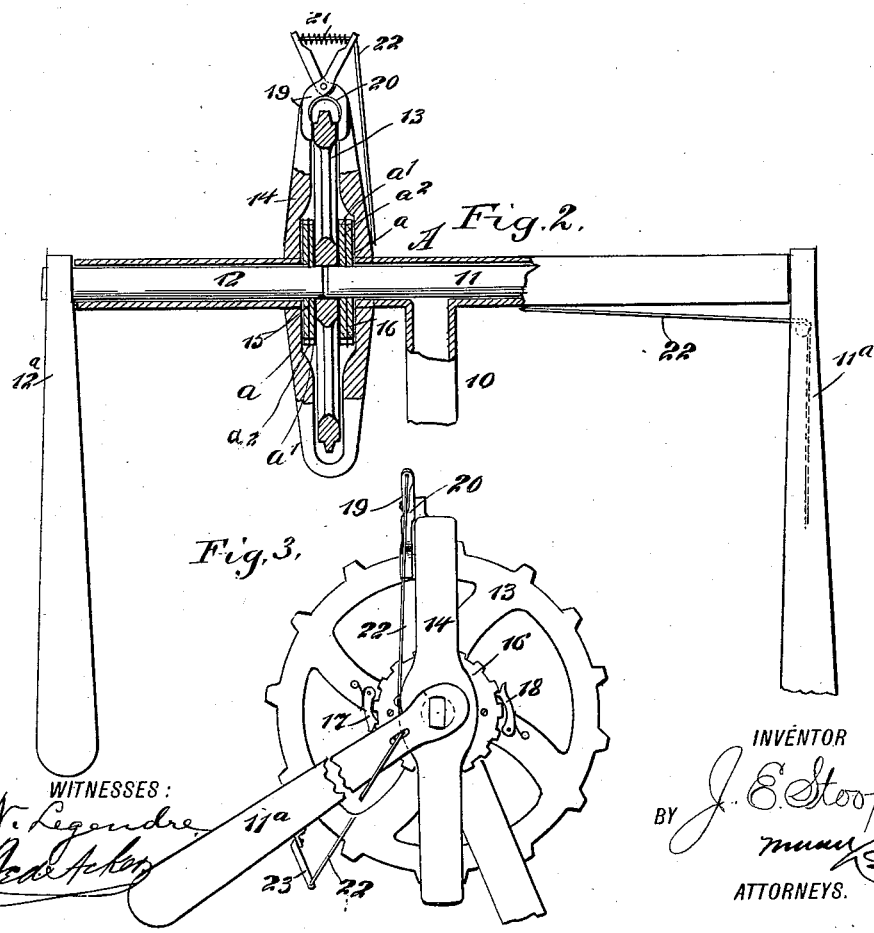
WITNESSES:
INVENTOR
J. E. Stoops
BY
ATTORNEYS.
THE NORRIS PETERS CO., PHOTO-LITHO., WASHINGTON, D. C.

UNITED STATES PATENT OFFICE.

JESSE E. STOOPS, OF DAYTON, WASHINGTON.

BICYCLE DRIVING-GEAR.

SPECIFICATION forming part of Letters Patent No. 595,501, dated December 14, 1897.

Application filed August 25, 1896. Serial No. 603,887. (No model.)

*To all whom it may concern:*

Be it known that I, JESSE E. STOOPS, of Dayton, in the county of Columbia and State of Washington, have invented a new and Improved Bicycle Driving-Gear, of which the following is a full, clear, and exact description.

The object of my invention is to provide a driving-gear for bicycles adapted to be operated by hand and which is auxiliary to and is used in connection with the ordinary pedal driving-gear, the two driving mechanisms being so arranged that they may be made to coact, or whereby either gear may be operated independent of the other, and whereby, further, the entire weight of the body, together with all the power exerted in the lifting operation of the hand driving mechanism, will be communicated to the driving mechanism operated by the feet.

A further object of the invention is to provide a driving-gear of the above-named character which may be applied to any form of frame with very slight alterations or additions.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a bicycle having the improvement applied. Fig. 2 is a partial side elevation and partial sectional view of a handle-bar to which the improved driving-gear is applied and from which said gear is operated, and Fig. 3 is an end view of the handle-bar and the gearing carried by the same.

In carrying out the invention the handle-bar A is provided with the usual sleeve 10, whereby it is fitted to the machine, and in the said handle-bar two shafts 11 and 12 are mounted to turn independently, and these shafts are to that end connected in any suitable or approved manner. The shaft 12 is provided with an attached lever $12^a$, located at one end of the handle-bar, and the shaft 11 has a corresponding lever $11^a$ attached to its outer end. A driving-wheel 13, preferably of a sprocket pattern, is loosely mounted where the two shafts 11 and 12 come together, and said driving-wheel is contained within a frame 14 of a yoke pattern secured to the handle-bar for the purpose of strengthening the said bar and preventing the gearing from having lateral movement.

At each side of the driving-wheel 13 a ratchet-wheel is located, the said wheels being designated, respectively, as 15 and 16, one of them being secured to the shaft 12 and the other to the shaft 11, and both of these ratchet-wheels are contained within the yoke 14. The ratchet-wheels are preferably made sectional, being in three parts—namely, an outer section $a$, an inner section $a'$, and an interposed section of an elastic material $a^2$, and the said elastic material extends outward beyond the periphery of the ratchet-wheels to a predetermined extent, being adapted for engagement with dogs 17 and 18, spring-controlled and pivoted to each side of the driving-wheel 13, the dogs extending in opposite directions, and by this means the operation of the gearing will be rendered noiseless, since the dogs will be brought in direct contact with the elastic surfaces. In the event that the elastic surfaces should unduly wear by tightening up the screws which connect the sections of the wheel the said elastic surfaces may be expanded, and when the said elastic surfaces become too much worn to permit of further expansion new surfaces may be introduced between the rigid sections of the ratchet-wheels.

Jaws 19 and 20 are located at the front upper portion of the yoke 14, and these jaws are adapted to engage with opposite sides of the driving-wheel 13, as shown in Fig. 2. The handle ends of the jaws 19 and 20 extend upward in divergent lines and are normally held apart by means of an interposed spring 21, so that normally the jaws will be held free from contact with the driving-wheel 13. One of the jaws is pivoted to the yoke, while the other jaw is rigidly attached thereto, and a cord or chain 22 is secured to the handle end of the pivoted jaw, being passed through the spring 21 and out through an opening in the fixed jaw, and this cord, rope, or chain is carried downward to the handle-bar and along the same over suitable bearings and out through an opening in one of the levers— the lever $11^a$, for example—to an attachment to a small or auxiliary lever 23, attached to the said handle-lever, the smaller lever being practically a brake-lever.

A chain $23^a$ is carried around the driving-wheel and from thence around a driving-sprocket 24, located on the axle of the front wheel of the machine, the hand driving-gear being adapted to rotate the front wheel and act independently of the usual pedal-gear B of the bicycle, the latter being connected in the usual way to the rear wheel of the machine.

As the right foot is pressed upon the pedal the right-hand lever is raised, and while lifting upon one lever the machine is steered by the opposing lever, and the act of lifting the lever 12$^a$ or 11$^a$ upward will tend to throw all the weight and power of the rider at that time directly upon the pedal, thereby bringing to bear all the force capable of being exerted by the body of the rider. The propelling action of the hand driving mechanism occurs at the upward movement of the hand-levers and is accomplished through the medium of the dogs engaging with the ratchet-wheels, the hand-levers, right and left, being alternately operated.

Having thus described my invention, I claim as new and desire to secure by Letters Patent—

1. In a bicycle driving-gear, a tubular handle-bar provided with two independent shafts journaled therein and mounted to turn independently of each other, each shaft having a hand-lever attached thereto at its outer end, a ratchet-wheel secured to each shaft near its inner end, a driving-wheel loosely mounted on the inner ends of the shafts between the ratchet-wheels, dogs located on the driving-wheel and engaging with the ratchet-wheels, and a driving connection between the said driving-wheel and a supporting-wheel of the machine, as and for the purpose specified.

2. In a bicycle driving-gear, a tubular handle-bar provided with two independent shafts journaled therein and mounted to turn independently of each other, each shaft having a hand-lever at its outer end, a yoke secured to the said handle-bar, a driving-wheel loosely mounted on the inner ends of the two shafts, an independent driving connection between each of said shafts and the said driving-wheel, the said driving-wheel and driving connections being contained within the said yoke, a driving connection between the said driving-wheel and a supporting-wheel of the machine, and brake-jaws carried by the said yoke and adapted to engage the said driving-wheel, the said brake-jaws being operated from one of the hand-levers, as and for the purpose specified.

3. In a bicycle driving-gear, a tubular handle-bar provided with two independent shafts journaled therein, each shaft having a hand-lever at its outer end, a driving-wheel loosely mounted on the inner ends of the shafts, an independent driving connection between each of said shafts and the said driving-wheel, a yoke connected with the handle-bar and within which the said driving-wheel and driving connections are arranged, the said yoke serving to strengthen the handle-bar and prevent lateral movement of the gearing, and a driving connection between the said driving-wheel and a supporting-wheel of the machine, as and for the purpose set forth.

4. In a hand driving-gear for bicycles, the combination, with a handle-bar, shafts loosely mounted in the handle-bar, having independent movement, a hand-lever attached to each shaft at its outer end, and a ratchet-wheel secured to each shaft at its inner end, of a yoke attached to the handle-bar, within which yoke the ratchet-wheels are contained, a driving-wheel adapted for connection with a supporting-wheel of the machine, the driving-wheel being loosely mounted upon the inner face of the aforesaid shafts, and dogs carried by the driving-wheel and engaging with the ratchet-wheels, as and for the purpose set forth.

5. In a hand driving-gear for bicycles, the combination, with a handle-bar, shafts loosely mounted in the handle-bar, having independent movement, a hand-lever attached to each shaft at its outer end, and a ratchet-wheel secured to each shaft at its inner end, of a yoke attached to the handle-bar, within which yoke the ratchet-wheels are contained, a driving-wheel adapted for connection with a supporting-wheel of the machine, the driving-wheel being loosely mounted upon the inner face of the aforesaid shafts, and dogs carried by the driving-wheel and engaging with the ratchet-wheels, each ratchet-wheel comprising an inner and an outer section and an interposed section of yielding material, arranged to be engaged by the dogs, whereby the operation of the hand-gearing will be substantially noiseless, as and for the purpose set forth.

6. In a hand driving-gear for bicycles, the combination, with a handle-bar, shafts loosely mounted in the handle-bar and having independent movement, a hand-lever attached to each shaft at its outer end, and a ratchet-wheel secured to each shaft at its inner end, of a yoke attached to the handle-bar, within which yoke the ratchet-wheels are contained, a driving-wheel adapted for connection with a supporting-wheel of the machine, the driving-wheel being loosely mounted upon the inner ends of the aforesaid shafts, dogs carried by the driving-wheel and engaging with the ratchet-wheels, each ratchet-wheel being provided with a surface of a yielding material, arranged to be engaged by the dogs, whereby the operation of the hand-gearing will be substantially noiseless, and a brake carried by the yoke, adapted for engagement by the driving-wheel, and means for operating the said brake from one of the hand-levers, as and for the purpose specified.

JESSE E. STOOPS.

Witnesses:
CHESTER F. MILLER,
J. G. MILLER.